Aug. 26, 1947.                     D. D. GRIEG                     2,426,201
                              RADIO DETECTION SYSTEM
                              Filed Jan. 4, 1943              3 Sheets-Sheet 3

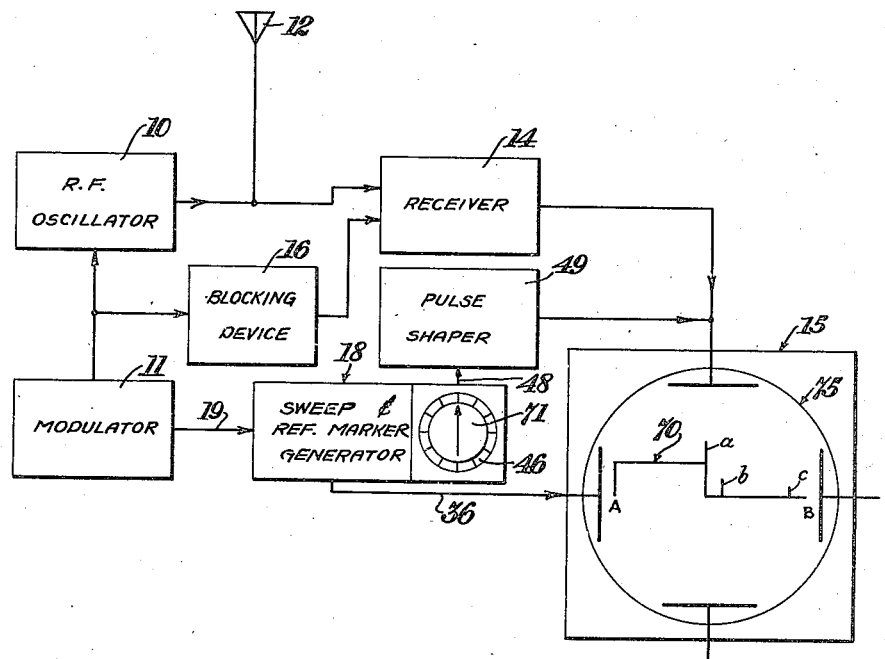
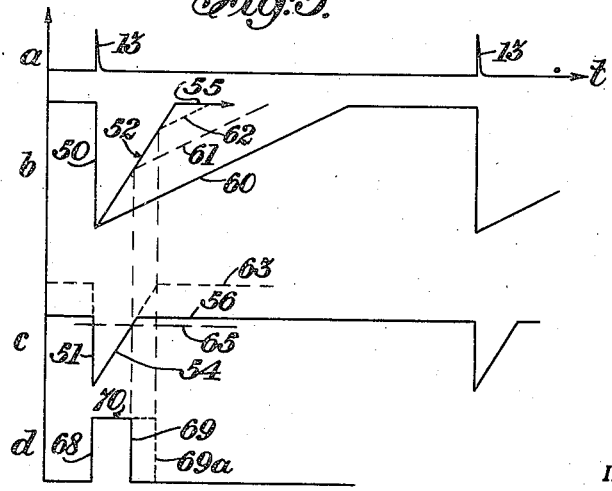
INVENTOR.
DONALD D. GRIEG

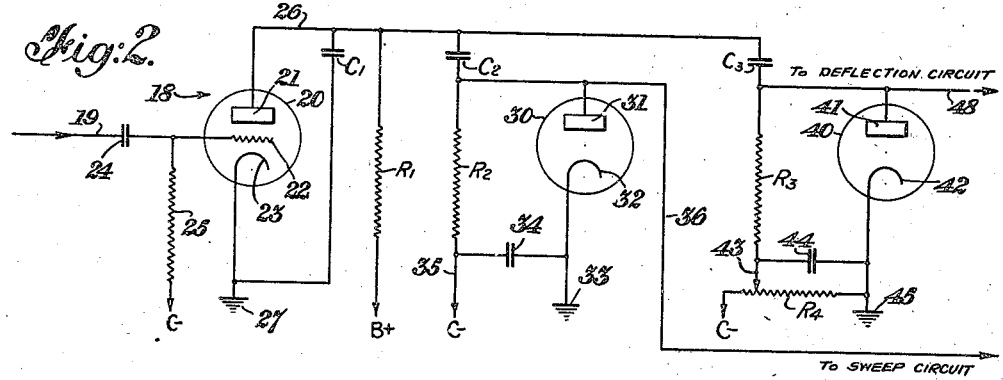

INVENTOR.
DONALD D. GRIEG
BY
*Percy P. Lantry*
ATTORNEY

Patented Aug. 26, 1947

2,426,201

UNITED STATES PATENT OFFICE 2,426,201

RADIO DETECTION SYSTEM

Donald D. Grieg, Forest Hills, N. Y., assignor to Federal Telephone and Radio Corporation, Newark, N. J., a corporation of Delaware Application January 4, 1943, Serial No. 471,229

4 Claims. (Cl. 250—1.66)

This invention relates to the control and generation of sweep potentials for oscillographs, particularly such as are used in radio object detection systems.

Radio detection systems heretofore proposed usually comprise two oscillographs in order to provide for panoramic viewing and for vernier measurement of distances to obstacles detected by the echo pulses caused thereby in response to transmitted impulses. That is to say, one of the oscillographs provides a panoramic view of a total effective range such as 200 miles or more and the second oscillograph provides a magnified view of a small portion such as 10 to 20 per cent of the total range of the first oscillograph. Thus, the first or panoramic oscillograph provides for an approximate measure of the distance to obstacles the echos of which appear on the screen thereof while the second or vernier oscillograph provides for vernier measurement of such distances.

It has been proposed heretofore to combine the two oscillographs into a single oscillograph and use one sweep to provide a panoramic viewing range and to substitute therefor a second and faster sweep to provide for vernier detection and measurement. This substitution of sweeps, however, has the disadvantage that when the vernier sweep is being used the viewing range is greatly restricted and the operator cannot observe the movement of obstacles beyond the small vernier range without changing back to the panoramic sweep.

It is an object of my invention to provide a system having an oscillograph the sweep potential of which is alterable from a first voltage build-up rate to a second voltage build-up rate at selected demarcation points along the sweep line thereof, the first rate, for example, to normally indicate a given range for viewing echo pulses for approximate determination of distances to obstacles and the second rate to provide for more accurate determination of distances to selected obstacles within a predetermined portion of said given range.

In accordance with one of the features of my invention, I provide for generation of a sweep potential which follows a given build-up rate so as to provide, for example, for a given screen width a panoramic view of a range such as 200 miles or more so that the presence of any enemy aircraft or ships within that range may be readily detected. Any movement of enemy aircraft or ships within such a range may be observed and should the craft come within a distance of 50 miles more or less of the detection apparatus, a reference marker may be moved along the trace line of the oscillograph toward the location of the echo pulse representing the craft. The generation of the reference marker is such as to alter the build-up rate of the sweep potential as the marker is moved across the screen. For example, the build-up of the sweep potential to the left of the reference marker will be at a fast rate such as to provide for vernier measurement while the build-up rate of the sweep potential to the right of the marker will be slower thereby affording panoramic viewing of obstacles.

According to another feature of the invention, the change in the build-up rates of the sweep potential is such that two different predetermined rates are established regardless of the location of the reference marker. Thus, should the trace line of the oscillograph represent a 200 mile range for one rate and say 50 miles for the other rate, the reference marker will convert the trace line from one rate to the other as the marker is moved therealong. This enables one to obtain accurate measurement of distances to obstacles occurring within the 50 mile range while, at the same time, a viewing distance is provided beyond the marker. The over-all viewing range may vary from the 50 mile vernier range to the total effective 200 mile panoramic viewing range. It will be understood, of course, that should the reference marker be moved to a point near the far end of the 50 mile vernier range that the remaining portion of the sweep will provide but a very small additional viewing distance therebeyond and should the reference marker be moved all the way to the far end of the trace line then the additional viewing distance will be eliminated.

According to still another feature of the invention, the two rates of potential build-up for the sweep may be such that as the marker is moved across the screen the viewing portion of the sweep beyond the marker will vary in rate of build-up so that substantially an overall viewing range of 200 miles is maintained at all times regardless of the location of the reference marker. That is to say, as the reference marker is moved along the trace line the additional viewing portion therebeyond condenses in proportion to movement of the marker from the near end of the trace line.

The above and other objects and features of the invention will become more apparent upon consideration of the following detailed description to be read in connection with the accompanying drawings, in which:

Fig. 1 is a schematic illustration of a radio detection system embodying my invention;

Fig. 2 is a schematic wiring diagram of one embodiment of sweep and reference marker generator of my invention;

Fig. 3 is a graphical illustration of the operating steps of the embodiment shown in Fig. 2;

Fig. 4 is a graphical illustration of the operation of the generator of Fig. 2 in a radio detection system of the character shown in Fig. 1;

Figures 5, 6:
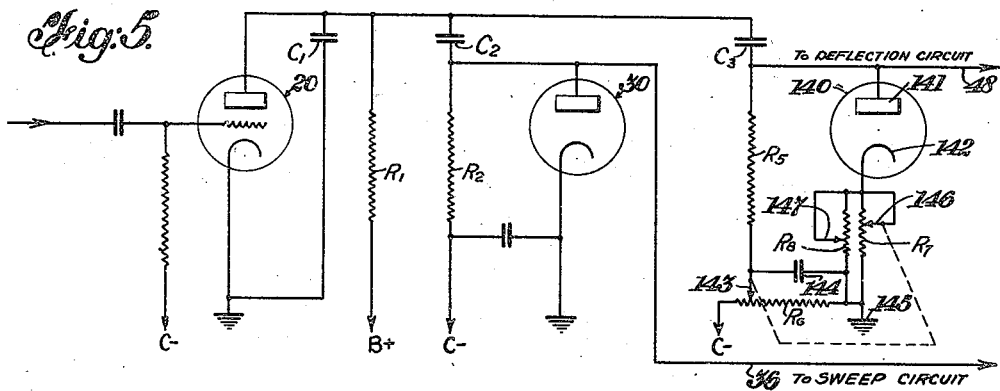
Fig. 5 is a schematic wiring diagram of another embodiment of a sweep and reference marker generator.
Fig. 6 is a graphical illustration of the operation of the generator of Fig. 5 in a radio detection system such as illustrated in Fig. 1.

Referring to Fig. 1, the radio detection system therein shown includes a transmitter comprising a radio frequency oscillator 10 and a pulse modulator 11 by which impulses are transmitted over an antenna 12. The transmission of the impulses may be recurrent at a given frequency or the recurrence may be unsteady. A receiver 14 and a cathode ray oscillograph 15 are provided to receive and indicate echo pulses caused by obstacles in response to the transmitted impulses. Connecting the transmitter to the receiver is the usual blocking device 16 arranged to block the receiver during the transmission of impulses. A generator 18 controlled by synchronizing pulses over connection 19 from the modulator 11 is provided for generation of a sweep potential for the oscillograph 15 and for generation of a reference pulse marker by which distances to echo pulses appearing within a given range may be obtained with a high degree of accuracy.

Referring to Fig. 2, there is shown, schematically, the wiring diagram of one embodiment of the sweep and reference marker generator 18. The generator comprises an input tube 20 having an anode 21, a grid 22 and a cathode 23. Connected to the grid 22 is the input connection 19 from the modulator 11. The connection 19 is connected to the grid through a coupling condenser 24. The tube 20 is biased to cut-off through a resistor 25 connected to the grid 22. The anode 21 is connected to a lead 26 which connects in parallel arrangement candensers $C_1$, $C_2$ and $C_3$. The condenser $C_1$ is connected to a terminal of the cathode 23 which is grounded at 27. The anode lead 26 is connected to a source of positive potential through a resistor $R_1$. Connected to the condenser $C_2$ is a sweep generating circuit having a diode tube 30. The anode 31 of this tube is connected to the condenser $C_2$ and is provided with a negative bias through a resistor $R_2$ of relatively high value. The cathode 32 of the tube 30 is connected to ground at 33 and is provided with a condenser 34 to the input side 35 of the resistor $R_2$. The sweep potential is taken off from the anode 31 through an output connection 36.

The portion of the generator circuit which provides the reference marker comprises a tube 40 the anode 41 of which is connected to the condenser $C_3$. The tube 40 is provided with a negative bias through a resistor $R_3$ of relatively high value. This resistor is connected to the anode side of the tube 40. The cathode 42 is connected to ground at 45 and to the input tap 43 of the resistor $R_3$ through a condenser 44. The bias on the tube 40 is controlled by a potentiometer $R_4$ one end of which is connected to ground at 45 and the other end of which is connected to a source of negative bias. The tap connection 43 is movable along the resistance of the potentiometer $R_4$ whereby the bias applied to the tube 40 can be varied as desired. This tap connection may be provided with a calibration such as indicated at 46 (Fig. 1) whereby the position of the marker with reference to the synchronizing pulse can be readily determined. A marker output connection 48 is taken off at the anode side of the tube 40 and is applied to a pulse shaper 49 (Fig. 1).

The pulse shaper 49 may comprise any suitable means for shaping the pulse output such as may be obtained by use of a multivibrator or a clipper of an amplifying type. Curve $d$ of Fig. 3 illustrates a desirable pulse shape the production of which is described more in detail hereinafter.

In operation of the circuit shown in Fig. 2, whenever an impulse 13 is received over the input connection 19, the tube 20 is triggered to discharge any charge existing upon the condensers $C_1$, $C_2$ and $C_3$. This produces a sharp voltage drop on the output connections 36 and 48 as indicated by the vertical lines 50 and 51 respectively, in Fig. 3. Immediately after the discharging of the condensers a re-charging thereof is initiated by the positive potential connected to the lead 26 through the resistor $R_1$. The normal rate of this re-charge is indicated by the slopes 52 and 54 of curves $b$ and $c$ and is determined almost exclusively by the time constant $C_1R_1$. This control by the time constant $C_1R_1$ is effected by making the resistors $R_2$ and $R_3$ high compared to $R_1$. Referring to the sweep voltage generated for the output 36, it will be noted that the build-up as indicated at 52 continues until a voltage is obtained substantially equal to the bias on the tube 30. At this point the tube will commence to function and will discontinue the build-up as indicated at 55. This build-up voltage occurs at a rate which is illustrated in Fig. 4 and may be so selected as to cover a range of 50 miles therein as indicated.

The marker producing portion of the circuit operates in a similar manner except that the bias on the tube 40 thereof is adjustable so that the tube 40 may be made conductive at any point along the build-up slope 52. The corresponding voltage build-up on the anode 41 is indicated by the line 54 in curve $c$, Fig. 3. The bias to cut-off on the tube 40 may be selected as indicated by curve $c$ to cause the tube to conduct at a voltage indicated by the level 56. If the bias on the tube 40 were such that it would cause the tube to be conductive at the instant the voltage build-up 54 is initiated, such conduction being direct to ground at 45 would place the condenser $C_3$ directly in parallel to ground with the condenser $C_1$. This condition alters the time constant from a value $C_1R_1$ to $(C_1+C_3)R_1$. This is a close approximation and holds substantially the same for different biases placed on the tube 40. For example, since the resistors $R_2$ and $R_3$ are chosen high, they have substantially no effect upon the value of the time constant as determined by $C_1R_1$ and $(C_1+C_3)R_1$.

The time constant being increased by the conductive condition in the tube 40 produces a voltage build-up rate indicated by the slope 60, curve $b$, Fig. 3. This slope as indicated in Fig. 4 is so selected as to provide a range equal to 150 miles as compared to the potential build-up 52. As the bias on the tube 40 is increased, that is, made more negative, the conduction of the tube 40 is caused to occur at a corresponding voltage level along the curve 54. The conduction of the tube 40 occurring at the level 56 causes the rate of voltage build-up 52 to change in accordance with the time constant $(C_1+C_3)R_1$ thereby producing a continuation of the voltage build-up along a slope 61. Should the bias on tube 40 be further increased to a level 63, this would produce a change in the build-up rate of the curve 52 in accordance with a rate 62. It will thus be clear that the sweep potential delivered at the output 36 may have dual rates, one rate prior to the occurrence of conduction by the tube 40 and a second rate thereafter.

In order to provide a substantially rectangular marker pulse from the potential at the output 48, I shape the potential preferably by clipping it along a limiting level 66 and thereafter or simultaneously amplifying the limited portion of the potential to provide a rectangular shape substantially as illustrated at 70. By varying the bias on the tube 40 the width of the pulse 70 may be varied. The leading edge 68 of the pulse 70 corresponds in time with the occurrence of a synchronizing impulse 13 while the trailing edge 69 corresponds to the occurrence of conduction through the tube 40. Thus, when the bias on the tube 40 is increased to the level 63, the pulse width 70 is increased as indicated at 69a. The pulse 70 when applied to the deflecting plates of the oscillograph 15 appears on the screen 75 substantially as indicated in Figs. 1 and 4.

For purposes of illustrating the utility of the dual voltage build-up of the sweep potential and of the coactive relation therewith of the indicator pulse 70, I have assumed that the maximum viewable range A—B of the oscillograph is equal to 150 miles. This maximum viewable range is covered by the sweep potential when following the voltage build-up rate 60. This assumption is therefore based on the fact that the reference marker is at zero indication and therefore that the tube 40 is conducting the moment a re-charging of the condensers $C_1$, $C_2$ and $C_3$ is initiated.

Of the echo pulses $a$, $b$ and $c$ shown in Fig. 4, it will be noted that the pulses $a$ and $b$ only are within the 50 mile range while $c$ is some distance therebeyond. By adjusting the dial 71 (Fig. 1) thereby moving the tap 43 along the potentiometer $R_4$, the bias on tube 40 can be increased. Such adjustment causes the trailing or marker edge 69 of the pulse 70 to be advanced across the screen 75 until the pulse $a$ is lifted by the marker to the position indicated by pulse $a_1$ (Figs. 1 and 4). At this position of the dial 71 a reading on the calibration 46 may be taken indicating with a high degree of accuracy the distance to the obstacle causing the echo $a$.

It will be noted in Fig. 4 that the advancement of the marker 69 produces a shifting of the pulses on the screen from positions $a$, $b$ and $c$ to $a_1$, $b_1$ and $c_1$. The reason for this shift is the effect of the dual rates of voltage build-up on opposite sides of the marker 69. The faster rate of build-up 52 gives a total range of 50 miles for the full width of the screen as compared to 150 miles for the slower rate 60. Thus, distances may be determined with greater accuracy by the rate 52 than by the rate 60. This dual characteristic of the sweep potential, however, provides for a viewing portion beyond the position of the marker 69 and at a rate corresponding to the voltage build-up 60. This second sweep potential is indicated for different positions of the marker by the lines 60, 61 and 62 (Figs. 3 and 4).

Since the rates indicated by the lines 60, 61 and 62 remain substantially the same, the total distance viewable along the trace line diminishes as the marker 69 is advanced across the screen. While the marker is at zero the full viewable range of 150 miles is obtained and a proportional decrease occurs as the marker is advanced to the right across the screen until the minimum or vernier range of 50 miles is reached.

It follows that for a measurement of the distance to the obstacle causing the echo pulse $b$ a movement of the marker 69 must be effected so as to lift the pulse $b$ to superposition on the marker 69 as indicated at $b_2$. For this position on the marker the pulse $a$ remains in the position assumed at $a_1$ while the echo pulse $c$ again shifts to the position $c_2$. Since the pulse $c$ is beyond the 50 mile mark, it cannot be reached by the marker 69 even if the marker were moved to the far extremity of the trace line A—B. It will be observed, however, that the echo pulses to the right side of the marker 69 retain the same relative position for variations of the marker location. The reason for this is the parallel relation of the slopes 60, 61, 62, etc.

In the circuit shown in Fig. 5 the panoramic sweep voltage varies in rate of build-up as the marker pulse is advanced along the trace line. The purpose of this feature of the invention is to maintain as nearly as possible a constant viewable range on the oscillograph regardless of the vernier measurements performed by manipulation of the reference marker 69. The input circuit including tube 20 and the sweep generating circuit including tube 30 in Fig. 5 are identical to the corresponding circuits of Fig. 2. The reference marker producing circuit, however, is different when the bias on the tube 140 is varied, a corresponding variation is produced in the time constant controlling the sweep potential produced at the output 36.

In the circuit of Fig. 5, the anode 141 is provided with a bias through a resistor $R_5$ connected to a tap 143 on a potentiometer $R_6$ similarly as arranged in Fig. 2. The cathode 142 is connected through a variable resistor $R_7$ to ground at 145. An adjustable tap 146 on the resistor $R_7$ is ganged to the tap 143. I also provide an adjustable resistor $R_8$ between the cathode 142 and ground 145. Connected between the tap 143 and the ground side of the resistor $R_8$ is a condenser 144.

The operating results of the circuit shown in Fig. 5 are illustrated graphically in Fig. 6. I have assumed here a maximum range of 200 miles for panoramic viewing according to a sweep rate 80 when the marker 69 is at zero position on the screen 75. As the marker 69 is advanced along the trace line A—B to a point so as to superimpose thereon the pulse $a$ as indicated at $a_1$, a faster rate 81 is provided to the left of the marker and a slower rate 82 is provided for the trace line to the right of the marker. This is caused by the ganged operation of the taps 146 and 143. When tap 143 is moved, the resistance $R_7$ between the cathode 142 and ground is simultaneously varied. The value of $R_7$ affects the value of the time constant for the re-charging of the condensers according to $(C_1+C_3)(R_1R_7)$. The ganged relation of $R_6$ and $R_7$ is such that $R_7$ is a minimum when maximum negative bias is placed on the anode 141. Thus $C_3$ is placed more or less in shunt with the condenser $C_1$ thereby changing the slope of the sweep voltage for the trace line to the right of the marker 69. The resistor $R_8$ serves as an adjustment for proper variation of the sweep potential for a particular overall range. As the marker 69 is advanced to echo pulse $b_2$, the portion of the trace line to the right of the marker is controlled by a rate 83 which is still slower than the rate 82. Thus, as the marker 69 approaches the far end B of the trace line, the sweep portion between the marker 69 and B decreases proportionally and thereby condenses more and more the remaining time interval of the total range. It will be apparent that this condensing may be so great as to render it difficult to distinguish pulses in the condensed portion of the trace line as the marker 69 nears the end B. This difficulty, however, is not particularly acute until the marker has been moved about 75 to 85 per cent or so of the distance across the screen. However, while the pulse c is some considerable distance beyond the 50 mile range, it will not, theoretically at least, leave the trace line A—B as the marker 69 approaches the end B.

From the foregoing description it will be appreciated that in accordance with my invention, the approach or movement of enemy craft can be detected and observed throughout a distance of 200 miles or more, as may be desired, and when a craft comes within 50 miles or so the distance to such craft can be determined while still maintaining observation of craft at further distances. The screen 75 may be calibrated and/or provided with a special marking indicating the extent of vernier measurements such as the 50 mile mark shown in Fig. 4.

While I have described herein the principles of my invention in connection with two specific circuits and applied the circuits to a particular form of radio detection apparatus, it will be understood that these illustrations are given by way of example only and not as limiting the scope of the invention as set forth in the objects thereof and the appended claims.

I claim:

1. A method of providing for a cathode ray oscillograph a sweep potential having dual rates of voltage increase comprising supplying energy to build-up a sweep potential at a given rate of increase, changing from said given rate of increase to a different rate by shunting a part of the supply of energy when the potential reaches a given value, continuing the potential increase at said different rate, and determining the amount shunted in accordance with the value of the potential at which the shunting action is initiated, whereby the potential build-up during any two rates for a given interval of time terminates at substantially the same value of potential.

2. A system to provide for a cathode ray oscillograph a sweep potential having dual rates of voltage increase comprising means to supply energy to effect an increase of potential at a given rate, means to change said given rate of increase to a different rate when the potential reaches a certain value, adjustable means to selectively determine the value of the potential at which said change in rate occurs, said adjustable means comprising means for shunting a part of the supply of energy and means for determining the amount shunted in accordance with the value of the potential at which the shunting action is initiated, whereby the potential build-up during any two rates such as determined by the value of the potential at which a shunting action is selected to occur terminates the potential build-up at substantially the same potential value for a given interval of time.

3. A system for providing dual rates of potential increase to a given maximum voltage comprising a circuit having an input tube, including an anode, a grid and a cathode, means to determine the time constant of said circuit and thereby the rate of sweep potential build-up of the system including a first condenser, circuit means connecting said condenser between said anode and said cathode and also connecting said cathode to ground, means to provide a source of energy for the anode, means including a second condenser connected in circuit with said anode adapted to control said given maximum voltage, control means to change the time constant of the system by a change in the rate of voltage build-up with respect to said two condensers at a selected potential, and means to apply a source of synchronizing pulses to said grid to effect discharge of said first and second condensers.

4. A system to provide for an oscillograph a sweep potential having dual rates of voltage increase, comprising a circuit having an input tube including an anode, a grid and a cathode, a first condenser, circuit means connecting said first condenser between said anode and said cathode and also connecting said cathode to ground, means to provide a source of energy for the anode, a second condenser connected to said anode, means to normally determine the rate of potential build-up on said second condenser; control means associated with said anode to change the rate of said potential build-up at a selected potential, said control means comprising a third condenser having one side thereof connected to said anode, a vacuum tube having a first electrode connected to the other side of said third condenser, a second electrode for said tube, means to vary the potential between said tube electrodes to determine a potential obtainable on said third condenser at which the tube will conduct; and means to apply a source of synchronizing pulses to said grid to effect discharge of said first and second condensers.

DONALD GRIEG.

REFERENCES CITED

The following references are of record in the file of this patent:

UNITED STATES PATENTS

| Number | Name | Date |
|---|---|---|
| 2,300,189 | Wolff | Oct. 27, 1942 |
| 2,271,876 | Seeley | Feb. 3, 1942 |
| 2,037,577 | Harries | Apr. 14, 1936 |
| 1,832,402 | Langer | Nov. 17, 1931 |
| 2,230,926 | Bingley | Feb. 4, 1941 |
| 2,097,066 | Hoover | Oct. 26, 1937 |